United States Patent
Yip et al.

(10) Patent No.: US 8,897,292 B2
(45) Date of Patent: Nov. 25, 2014

(54) LOW PASS FILTER FOR HIERARCHICAL PIPELINED DISTRIBUTED SCHEDULING TRAFFIC MANAGER

(71) Applicant: Telefonaktiebolaget L M Ericsson (publ), Stockholm (SE)

(72) Inventors: Thomas C. Yip, Los Gatos, CA (US); Srivathsa Dhruvanarayan, Cupertino, CA (US); Edward Ho, Fremont, CA (US); Sun-den Chen, San Jose, CA (US); Michael Feng, Mountain View, CA (US); Jeffrey Hu, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/731,976

(22) Filed: Dec. 31, 2012

(65) Prior Publication Data

US 2014/0185451 A1 Jul. 3, 2014

(51) Int. Cl.
| | | |
|---|---|---|
| *H04L 12/50* | (2006.01) | |
| *H04L 12/851* | (2013.01) | |
| *H04L 12/869* | (2013.01) | |
| *H04L 12/865* | (2013.01) | |
| *H04L 12/863* | (2013.01) | |

(52) U.S. Cl.
CPC ............... *H04L 47/24* (2013.01); *H04L 47/60* (2013.01); *H04L 47/6275* (2013.01); *H04L 47/6215* (2013.01)
USPC .......................................................... 370/357

(58) Field of Classification Search
CPC .................. H04L 12/5693; H04L 12/5694
USPC ......... 370/357, 359, 360, 389, 412–419, 428, 370/429
See application file for complete search history.

(56) References Cited

U.S. PATENT DOCUMENTS

| | | |
|---|---|---|
| 6,370,144 B1 | 4/2002 | Chao et al. |
| 6,389,031 B1 | 5/2002 | Chao et al. |
| 6,519,595 B1 | 2/2003 | Rose |
| 6,594,234 B1 | 7/2003 | Chard et al. |
| 7,088,710 B1 | 8/2006 | Johnson et al. |

(Continued)

FOREIGN PATENT DOCUMENTS

| | | |
|---|---|---|
| EP | 0763915 | 3/1997 |
| WO | WO-2010125448 | 11/2010 |

OTHER PUBLICATIONS

Ye, Buffering and Flow Control in Optical Switches for high Performance Computing, IEEE, Optical commun. netw., Aug. 2011, pp. 1-14.*

(Continued)

*Primary Examiner* — Dmitry H Levitan
(74) *Attorney, Agent, or Firm* — Blakely, Sokoloff, Taylor & Zafman, LLP

(57) ABSTRACT

A method is implemented by a network element to provide scalable hierarchical traffic management (HTM) over a plurality of network layers for a network and eliminate priority leaking caused by quick loopback batch scheduling that analyzes a subset of network layers to shorten processing time and resource requirements when the scalable HTM selects data packets to be forwarded. The method and system function as a low pass filter over the selected data packets to prevent low priority data packets being forwarded where higher priority data packets are available to be forwarded.

12 Claims, 4 Drawing Sheets

(56) References Cited

U.S. PATENT DOCUMENTS

| | | | |
|---|---|---|---|
| 7,715,419 B2 * | 5/2010 | Tatar et al. | 370/419 |
| 7,986,706 B2 * | 7/2011 | Yip et al. | 370/412 |
| 8,156,265 B2 * | 4/2012 | Buick et al. | 710/52 |
| 2003/0099199 A1 | 5/2003 | Kiremidjian et al. | |
| 2004/0114517 A1 | 6/2004 | Grosbach et al. | |
| 2007/0073949 A1 | 3/2007 | Fredrickson et al. | |

OTHER PUBLICATIONS

International Search Report and Written Opinion, Application No. PCTIB2010000976, dated Aug. 5, 2010, 11 pages.

* cited by examiner

LOW PASS FILTER FOR HIERARCHICAL PIPELINED DISTRIBUTED SCHEDULING TRAFFIC MANAGER

FIELD OF THE INVENTION

Embodiments of the invention are related to the field of network processing. Specifically, the embodiments relate to a hierarchical pipelined distributed scheduling traffic manager.

BACKGROUND

Traffic managers are software executed by network elements used to implement quality of service (QoS) in a network including managing performance of metrics such as bandwidth usage, latency, jitter, input rate, and output rate on a per connection or per subscriber basis. Traffic managers are used in an integrated service model characterized by resource reservations. For example, real-time application can set up paths and reserve resources along the path within the network providing QoS prior to transmitting data over the path. Resource reservation protocol (RSVP) is a signaling protocol for setting up paths and reserving resources along these paths in a network. Traffic managers can communicate using RSVP and similar protocols to implement QoS over the network.

Traffic managers also can implement differentiated service models where data packets are marked differently to create different packet classes. Data packets in different classes receive different quality of service treatment by the traffic managers in a network as they traverse the network. Traffic managers can work in a multi-protocol labels switching (MPLS) network where data packets are assigned labels at the ingress and subsequent classification, forwarding, and quality of service for the data packets are based on the labels.

Traffic managers manage QoS levels by classifying, marking, policing and shaping data packet traffic. Traffic managers are implemented in a flat non-pipelined, central scheduling approach. Traffic managers are required to scan the queues of the network element in which the traffic manager is executed to find those data packets that need processing

SUMMARY

A method is implemented by a network element to provide scalable hierarchical traffic management (HTM) over a plurality of network layers for a network and eliminate priority leaking caused by quick loopback batch scheduling that analyzes a subset of network layers to shorten processing time and resource requirements when the scalable HTM selects data packets to be forwarded. The method receives a plurality of data packets to be forwarded by the network element and stores the plurality of data packets in a set of queues. The plurality of data packets are processed by a quick loopback batch scheduler to select a first data packet of the plurality of data packets to be forwarded by applying priority rules for a subset of the plurality of network layers. The first data packet is placed in a per priority first-in-first-out (FIFO) buffer that organizes data packets primarily by priority and secondarily by order of arrival. A second data packet is selected from the per priority FIFO buffer by a straight priority arbiter that selects a data packet that has a first arrival for a highest priority in the per priority FIFO buffer such that each priority has a defined throughput. The second data packet is placed in a mixed-priority FIFO buffer to be forwarded toward a destination of the second data packet. A per priority flow control value is returned from the mixed-priority FIFO buffer to the per priority FIFO buffer to limit low priority being selected by the straight priority arbiter. The data packets are then forwarded from the mixed-priority FIFO toward a respective destination through a rate limiter.

A network element implements the scalable hierarchical traffic management (HTM) over a plurality of network layers for a network and eliminates priority leaking caused by quick loopback batch scheduling that analyzes a subset of network layers to shorten processing time and resource requirements when the scalable HTM selects candidate data packets to be forwarded. The network element comprises a set of ports to receive a plurality of data packets to be forwarded by the network element and to forward the plurality of data packets to a set of queues and a network processor coupled to the set of ports, the network processor to execute the scalable HTM. The scalable HTM is configured to execute a quick loopback batch scheduler and a straight priority arbiter, the scalable HTM including a per priority first-in-first-out buffer and a mixed priority buffer. The quick loopback batch scheduler is configured to process the plurality of data packets to select a first data packet of the plurality of data packets to be forward by applying priority rules for a subset of the plurality of network layers and to place the first data packet in the per priority FIFO buffer that organizes data packets primarily by priority and secondarily by order of arrival. The straight priority arbiter to select a second data packet from the per priority FIFO buffer that has a first arrival for a highest priority in the per priority FIFO buffer such that each priority has a defined throughput and to place the second data packet in a mixed-priority FIFO buffer to be forwarded toward a destination of the second data packet, and the mixed priority FIFO buffer is configured to return a per priority flow control value from the mixed-priority FIFO buffer to the per priority FIFO buffer to limit low priority data packets being selected by the straight priority arbiter and to forward data packets from the mixed-priority FIFO toward a respective destination through a rate limiter.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
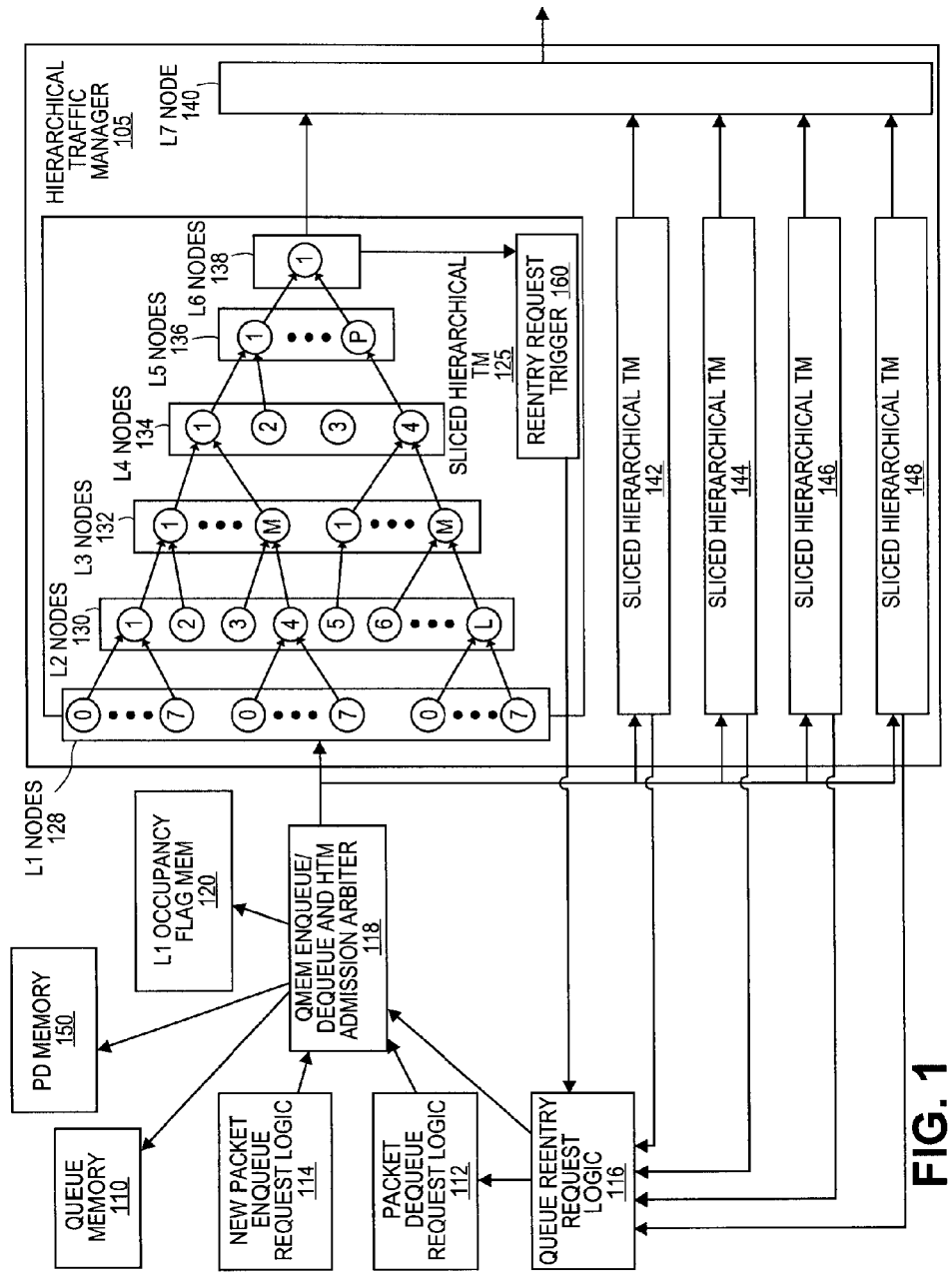
FIG. 1 is a diagram of one embodiment of an example architecture implementing a hierarchical traffic manager including quick loopback batch scheduling.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Embodiments of the invention provide a set of components that operate like a low pass filter for a hierarchical traffic manager that implements quick loopback batch scheduling. The components include a per priority first-in-first-out buffer, a straight priority arbiter, a mixed priority first-in-first-out buffer and a rate limiter. These components operate in combination to prevent priority inversion or priority leaks, which can occur when a hierarchical traffic manager implements quick loopback batch scheduling.

The advantages of the embodiments of the invention include preventing priority inversion or priority leak of quick loopback batch scheduling in hierarchical traffic managers. The process and system support the scalability provided by the quick loopback batch scheduling.

The disadvantages of the prior art include that network infrastructures have become more complicated regularly adding new layers of network management. The large number of network management layers affects hierarchical traffic management by diminishing throughput. Quick loopback batch scheduling was introduced to help hierarchical traffic management to scale with the number of network management levels. However, quick loopback batch scheduling can cause priority inversion or priority leaks that can cause lower priority traffic to be forwarded and high priority traffic to build up, which can result in high priority traffic being dropped rather than lower priority traffic.

A hierarchical traffic manager (HTM), as referred to herein is an arbiter that selects a candidate data packet with the highest priority and the lowest throughput rate from amongst a set of candidate data packets that have arrived at the network element of the hierarchical traffic manager. The set of candidate data packets from which the hierarchical traffic manager selects includes the data packets from each and every network management layer supported by the network element and hierarchical traffic manager. A 'set,' as used herein, refers to any positive whole number of items including one item. The total throughput of a hierarchical traffic manager is usually inversely proportional to the number of network management hierarchies that the hierarchical traffic manager handles. The more network management levels that are supported, then the longer the time or processing cycles that are required to select a winner from the set of candidates to be forwarded.

A quick loopback batch scheduler (QLBS) is implemented by a hierarchical traffic manager to assist with the scalability of hierarchical traffic management. The quick loopback batch scheduler decouples the throughput of the hierarchical traffic manager from the number of network layers serviced by the hierarchical traffic manager. The quick loopback batch schedule enables this scalability by use of techniques of 'quick loopback' and 'batch scheduling.'

Quick loopback refers to a process by which the arbiter of the hierarchical traffic manager does not examine all candidates at each and every network management layer to find the best candidate for transmission. Instead, the quick loopback process examines a subset of the available network layers to shorten the selection time. Batch scheduling refers to a process where each winning or selected candidate from the set of available candidates as determined by the hierarchical traffic manager is associated with a set or batch of data packets. Thus, each winner or selection is effectively a selection of a group of data packets rather than a selection of a single data packet. Thus, the processing resources and time expended to make a selection will result in a greater throughput than if only a single data packet had been selected.

A method and apparatus for a hierarchical pipelined distributed scheduling traffic manager is described. In one embodiment of the invention, the hierarchical pipelined distributed scheduling traffic manager (referred to herein as the "hierarchical traffic manager") includes multiple hierarchical levels to perform hierarchical winner selection and propagation in a pipeline including selecting and propagating winner queues of a lower level to subsequent levels to determine one final winning queue (the queue that contains packet(s) to exit the hierarchical traffic manager). The winner selection and propagation is performed in parallel between the levels to reduce the time required in selecting the final winning queue. In some embodiments, the hierarchical traffic manager is separated into multiple separate sliced hierarchical traffic managers to distributively process the traffic.

The hierarchical winner selection pipeline is triggered based on certain events and does not require the hierarchical traffic manager to scan for requesters (i.e., the hierarchical traffic manager does not repeatedly scan the queues to find queues with packets to process). In one embodiment, the trigger winner selection events (those events which trigger arbitration) include new packet enqueue requests, queue reentry requests, queue state change from blocked to unblocked, and preemption events.

FIG. 1 is a diagram of one embodiment of an example hierarchical traffic manager 105 in a network element according to one embodiment of the invention. In some embodiments, the hierarchical traffic manager 105 is included in a network processor such as a packet processing unit of each line card of the network element or is a separate ASIC on each line card of the network element. The hierarchical traffic manager 105 processes packets for many different queues that have been separated due to classification (e.g., behavior aggregate classification which includes the process of sorting packets based only the contents of the differentiated services field, multi-field classification based on the content of multiple fields such as source address, destination address, type of service (TOS) byte, protocol ID, source port number, destination port number, etc.) and marking (e.g., process to set the differentiated services field).

The hierarchical traffic manager 105 can includes policers to police the bandwidth usage per class of traffic (e.g., policing is the process of handling out of profile (excessive) traffic), shapers to shape input/output traffic per class of traffic (shaping includes delaying packets within a traffic stream to cause the traffic stream to conform to a predefined traffic profile), and schedulers to schedule the traffic in the order of marked (e.g., prioritized) packets (schedulers are used when determining the order of transmission of packets in a system of multiple queues). The hierarchical traffic manager 105 can be an ingress traffic manager or an egress traffic manager.

As illustrated in FIG. 1, the hierarchical traffic manager 105 can include multiple sliced hierarchical traffic managers (i.e., the sliced hierarchical traffic managers 125, 142, 144, 146, and 148). Each hierarchical traffic manager slice handles a portion of the bandwidth of the aggregate hierarchical traffic manager 105. Each of the sliced hierarchical traffic managers 125, 142, 144, 146 and 148 are functionally equivalent yet separate from each other and each has their own set of nodes, shapers, logic, and memories. The sliced hierarchical traffic managers 125, 142, 144, 146, and 148 may not perform any sharing with each other. For purposes of explanation, the sliced hierarchical traffic manager 125 will be described; however it should be understood that the operations described in reference to the sliced hierarchical traffic manager 125 are also applicable to sliced hierarchical traffic managers 142, 144, 146, and 148. Also, the details of the hierarchical traffic manager 105 having multiple slices 125, 142, 144, 146 and 148 is described in reference to FIG. 1, however, other examples do not show this detail for sake of convenience and clarity in discussing other components of the system and processes.

It should be understood that while FIG. 1 illustrates five sliced hierarchical traffic managers, the number of sliced hierarchical traffic managers is exemplary and more or less sliced hierarchical traffic managers can be used in embodiments of the invention. In addition, in some embodiments of the invention, a single, non-sliced hierarchal traffic manager is used. In some embodiments, the hierarchical traffic manager 105 is divided into a number of slices based on the maximum amount of traffic expected by any one customer. A customer (e.g., an end user subscriber, an Internet Service Provider (ISP), a service provider getting service from an ISP (e.g., the ISP is wholesaling their bandwidth)) is associated with one or more queues. For example, an end user subscriber may be associated with a few queues while an ISP may be associated with many queues. Each queue is associated with a minimum bandwidth (a guaranteed bandwidth). In some embodiments, queues are associated with different services (e.g., queues for web traffic, queues for VoIP, queues for interactive gaming, queues for video on demand, etc.).

Each of the sliced hierarchical traffic managers 125, 142, 144, 146, and 148 include a hierarchy of levels. For example, the sliced hierarchical traffic manager 125 includes, a lowest level (the largest number of nodes), a plurality of intermediate levels (with a subsequently decreasing number of nodes), and a highest level (with the least number of nodes). For example, from the lowest level (the largest number of nodes) to the highest level (the least number of nodes) the sliced hierarchical traffic manager 125 includes the level 1 (L1) nodes level 128, level 2 (L2) nodes level 130, level 3 (L3) nodes level 132, level 4 (L4) nodes level 134, level 5 (L5) nodes level 136, and level 6 (L6) nodes level 138. According to one embodiment, the L1 nodes level 128 represents queues to store packets that need to be processed by the sliced hierarchical traffic manager 125, and the levels 130-138 represent the topology of the network (e.g., the L2 nodes level 130 represents the subscriber level of the topology, L3 nodes level 132 represents the DSLAM (digital subscriber line access multiplexer) level of the topology, L4 nodes level 134 represents the VLAN (virtual local area network) level of the topology, the L5 nodes level 136 represents the Interlaken channel level of the topology, the L6 node level 138 represents the sub-PPA (packet processing ASIC) physical port level, and the L7 node level 140 represents the PPA port). As will be described later herein, one or more of the levels may include one or more sub-levels.

While seven different levels are illustrated in FIG. 1, it should be understood that any number of levels can be used in embodiments of the invention described herein (e.g., any number of levels can be utilized for each different network topology layer). One or more of these hierarchical levels can be skipped in certain circumstances. It should also be understood that the number the nodes in each level as illustrated in FIG. 1 is exemplary and different numbers of nodes can be used. While in one embodiment each sliced hierarchical traffic manager includes the same number of nodes and/or levels, in alternative embodiments different sliced hierarchical traffic managers include a different number of nodes and/or different number of levels.

The ratio of nodes between levels (e.g., the ratio of nodes between the L1 nodes level 128 and the L2 nodes level 130) is referred to as the "aggregation ratio" (e.g., the number of child nodes in one level connected to a parent node in a higher level). By way of example, the aggregation ratio between the L1 nodes level 128 and the L2 nodes level 130 in the illustrated example is eight to one (i.e., each L2 node in the L2 nodes level 130 (a parent node) has eight child nodes in the L1 nodes level 128). The aggregation ratio is typically determined based on the number of nodes in each level. In some embodiments, the aggregation ratio is configurable by system operators. As described above, the L1 level has the most number of nodes and each level thereafter typically has a decreasing number of nodes. Typically, the L7 node level 140 has a single node and each L6 node level 138 of each sliced hierarchical traffic manager also has a single node.

In one embodiment, each parent node is associated with multiple child nodes. For example, each node in the L2 nodes level 130 is mapped to different multiple nodes in the L1 nodes level 128. In one embodiment, a node in a lower level (a child node) is mapped to a single node in a higher level (a parent node) at any given time. In order to provide for level skipping, a system operator may associate a node in a lower level with a node in a higher level which skips other higher levels (e.g., a node in L2 nodes level 132 may be mapped to a node in the L4 nodes level 134 thereby skipping the L3 level).

The sliced hierarchical traffic managers 125, 142, 144, 146, and 148 each select a L6 winner based on a pipelined winner selection and propagation mechanism. For example, each sliced hierarchical traffic manager selects a L2 winner from a group of L1 nodes (L2 node's child nodes) according to their scheduling precedence parameters, propagates the L2 winner to the input of a L3 node, selects a winner from a group of L2 nodes (L3 node's child nodes) according to their scheduling precedence parameters, propagates the L3 winner to the input of a L4 node, and so on, until a L6 winner is selected. Each L6 winner of each sliced hierarchical traffic managers 125, 142, 144, 146, and 148 is then input to the L7 node 140 for L7 winner selection.

Each node, with an exception of the node in the highest level (e.g., the L7 node 140) is associated with a set of traffic management parameters that are used to control each node's bandwidth usage relative to its peer nodes of the same level, traffic rate, latency, and temporary traffic suspension (e.g., in order to treat the nodes fairly and in order to comply with any service level agreements). In one embodiment, WDRR (weight deficit round robin) is used for controlling each node's relative bandwidth usage (e.g., through use of WDRR weight tokens), rate tokens are used to control traffic rate, eight different priorities are used for latency control, and a system operator programmable blocked bit is used to temporarily suspend traffic. It should be understood that each level may use a different subset of the traffic management parameters. In addition, it should be understood that less parameters, additional parameters, and/or different traffic management parameters may be used in embodiments of the invention described herein. As will be described later herein, some of the set of traffic management parameters are propagated along the traffic pipeline, while others are calculated at different levels (e.g., rate status).

In one embodiment, a parent node of at least some of the levels (e.g., the levels 2-4) categorizes its child nodes in an arbitration precedence hierarchy according to their priority, rate status, and weight token status. For example, the parent node categorizes their child nodes by priority (a child node with a higher priority takes precedence over a child node with a lower priority). For each priority group, the parent node categorizes the child nodes among the rate status (e.g., a below minimum group, a below maximum group, and an above maximum group). For each rate status group, the parent node categorizes the child nodes by weight token status (e.g., a positive weight token status group, and a negative weight token status group).

A node in a level other than the nodes in the L1 nodes level 128 typically includes a requester and a scheduler/arbiter. The queue memory enqueue/dequeue and hierarchical traffic manager admission arbiter 118 (hereinafter "arbiter 118") arbitrates between different requesters (e.g., new packet enqueue requests, packet dequeue requests, queue reentry requests) to determine access to the hierarchical traffic manager 105 and updating of the queue memory 110 and the PD (packet data) memory 150. In one embodiment, the arbiter 118 enqueues packets to their designated queue at a line rate. The queue memory 110 stores information for each of the queues (e.g., for each queue: in-flight packet count, in-flight packet bytes, weight token counters, rate token counters, etc.). The PD memory 150 stores information for packets of each queue (e.g., head/tail pointers of each packet).

The arbiter 118 allows admission of packets to the hierarchical traffic manager 105 without the hierarchical traffic manager scanning the queues (e.g., of the queue memory 110) for packets. Thus, unlike typical prior art traffic managers which scan the queues for requesters, the hierarchical traffic manager 105 is provided the requesters (e.g., the queues that include packets) that require processing by the hierarchical traffic manager 105. The arbiter 118 selects among different groups of requesters to admit to the hierarchical traffic manager 105 (e.g., new packet enqueue requests, packet dequeue requests, and queue reentry requests). Thus, the arbiter 118 arbitrates for the access of the queue memory 110 among new packet enqueue requests from the new packet enqueue request logic 114 (e.g., the new packet enqueue requests generated responsive to receipt of a trigger from a processor such as an execution unit (EU) or line processor (LP), a packet reordering logic, etc.), packet dequeue requests from the packet dequeue request logic 112 (e.g., the packet dequeue requests generated responsive to a trigger from an EU/LP or from the queue reentry request logic 116), and queue reentry requests from the queue reentry request logic 116 (e.g., the queue reentry requests generated responsive to receiving a trigger from the queue reentry request trigger 160 representing a previous L6 winner).

In some embodiments of the invention, any physical level of the hierarchical traffic manager 105, with the exception of the first level (e.g., queue level), can be skipped during the winner selection and propagation process. In one embodiment, the system operator may configure any node of a physical hierarchical traffic manager level as being mapped to a node at a different level than the next subsequent level (e.g., a level 1 node can skip level 2 and map to any other levels, etc). The hierarchical traffic manager can be configured to skip certain levels for those network deployments that do not match the physical levels. For example, a particular network deployment may not need each physical level in the hierarchical traffic manager (e.g., it may only require 3 levels instead of 5 levels). In other embodiments, levels can be skipped to reduce the processing and memory requirements for carrying out the traffic management functions thereby improving scalability of the hierarchical traffic manager.

In some embodiments, the L6 winners from the sliced hierarchical traffic managers 125, 142, 144, 146, and 148 that are not selected by the L7 node can be resubmitted to the arbiter 118 as a reentry request. The unselected candidates from any level in the hierarchical traffic manager can be resubmitted as a reqentry request. However, most candidates are not dequeued or removed from the sliced hierarchical traffic managers 125, 142, 144, 146, and 148 and instead stay in place and can then be selected on subsequent selection iterations. The resubmission of a candidate as a reentry request is referred to as a 'loopback' and is part of the process that defines the 'quick loopback batch scheduling.'

In some embodiments, batching is used rather than the selection of candidates that represent a single data packet. Packet batching is a process that allows a L1 node to carry X number of packets as a single requester to its parent node (in the L2 nodes level). The winner of the L2 node inherits the X number of packets and propagates them as a batch to its parent, and so on, until a single L7 winner is found. In one embodiment, the hierarchical traffic manager 105 supports any number of packets being batched into the hierarchical traffic manager. For queue reentry requests, the batched packet size will vary depending on how many packets are in the queue and the packet size. The combination of level skipping (i.e., making the process quicker and less resource intensive), loopback in the form or reentry requests and batch scheduling is referred to herein as 'quick loopback batch scheduling' (QLBS). For sake of convenience and clarity the components of the hierarchical traffic manager described herein above in regard to FIG. 1 are subsequently referred to in FIG. 2 and later description as the quick loopback batch schedule (QLBS).

However, one skilled in the art would understand that the principles and structures described with relation to the hierarchical traffic manager can be differently configured into other permutations of components such that the functionality is differently distributed amongst the constituent components without exceeding the scope of the invention and the embodiments described herein by way of example rather than limitation.

Figure 2:
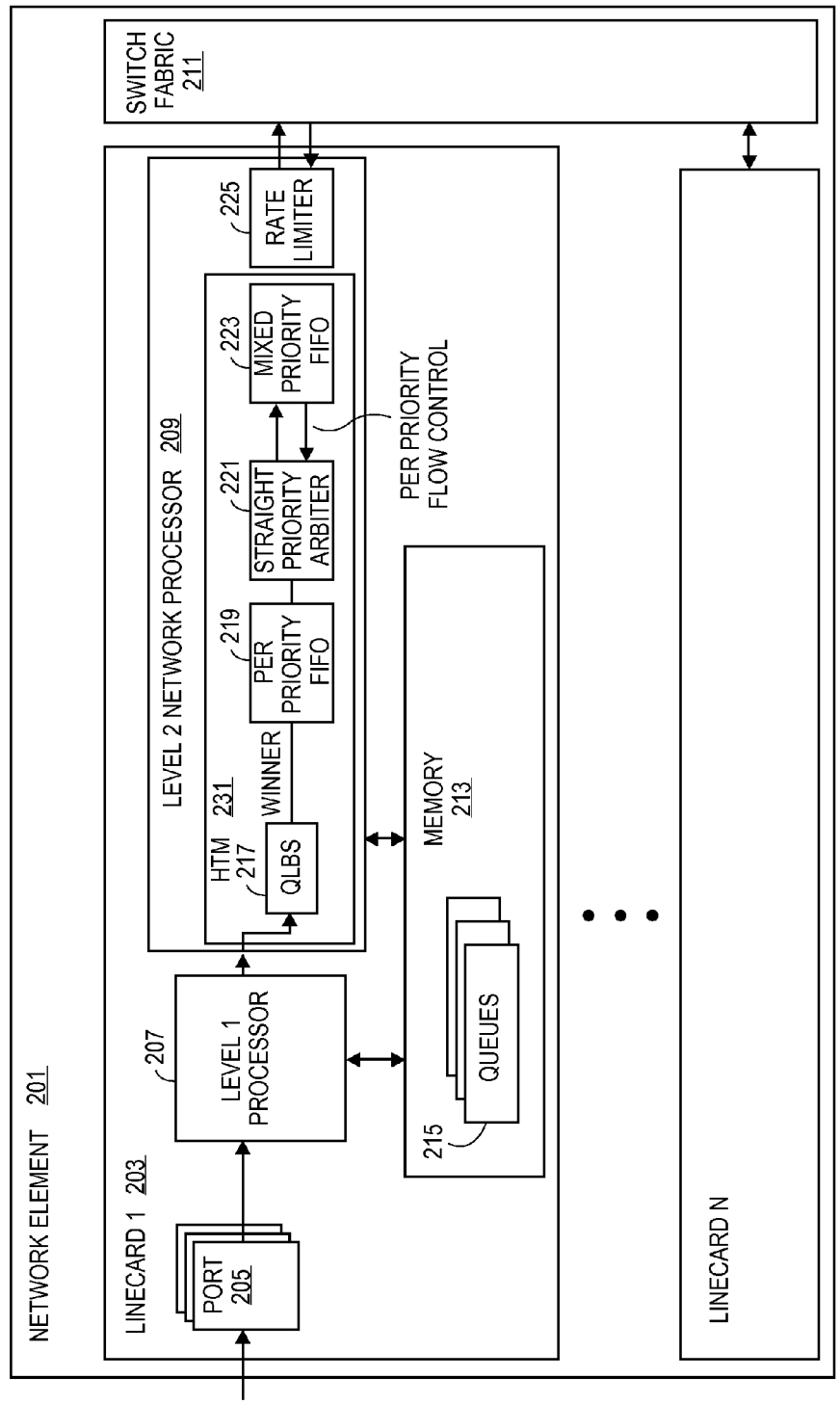
FIG. 2 is a diagram of one embodiment of a network element including the hierarchical traffic manager with a low pass filter.

FIG. 2 is a diagram of one embodiment of a network element including the hierarchical traffic manager with a low pass filter. In one embodiment, the hierarchical traffic manager is implemented as part of a network element such as a switch, router or similar networking device that enable the communication of data over networks using a variety of protocols for data transmission and quality of service (QoS) management and similar processes within a network. The network element can include a set of line cards that provide forwarding and network policy implementation services. The line cards can be programmed by an internal or external controller that manages network level policies and traffic shaping.

A network element 201 can include any number of linecards 203. The network element 201 can also include a switch fabric 211, which is an interconnect that allows each of the linecards 203 to communicate with one another and to pass data packets between each other in route to the destination of the data packets over a port tied to one of the linecards. In one embodiment, the network element 201 can also include a network processor or similar processing resource that can provide some administrative control or may assist the linecards in the packet processing and forwarding. The linecards 201 can have identical or differing resources and can each be tied to any number of external ports that provide communication with any number of remote networking devices or computing devices as part of any number of separate networks.

The linecards 203 can include a set of components including a set of ports, processors and storage. The ports 205 can include ingress and/or egress ports to receive or transmit data packets over a network connection. Each linecard 203 can include any number of ingress or egress ports 205. The ingress or egress ports 205 can be in communication with a set of processors 207 and 209, which process the data packets and forward them toward their destination.

In one embodiment, the linecard 203 can include multiple network processors 207 and 209. In other embodiments, the network processing can be implemented in a unified network processor or similar device. In the example illustrated embodiment, the data packet processing is divided between a level one processor 207 and a level two processor 209. The level one processor can process the lower layers of the data packets as they are received or transmitted including layer one and layer two processing. The level two processor 209 can process the layer three (e.g., Internet Protocol (IP)) and similar layers of the data packets including implementing the policies and priorities of the various layers of the network topology in which the network element is situated via a hierarchal traffic manager 231.

The linecard 203 can also include a memory 213 that can serve as a storage space for data traffic and a working memory for the network processors 207 and/or 209. In other embodiments, the memory 213 can be divided into any number of separate storage locations or devices accessible by any combination of the components of the linecard 203. In some embodiments, data packets can be queue 215 prior to or as part of the hierarchical traffic manager implementation.

The hierarchical traffic manager 231 can implement any number of levels of network policies, such as QoS and similar network policies as described in detail in regard to FIG. 1. In one embodiment, the hierarchical traffic manager 231 implements quick loopback batch scheduling to manage traffic at the network element 201. Quick loopback batch scheduling can help the network element to scale to provide efficient traffic management over a large number of network layers, however, it can cause priority leak or inversion where lower priority data packets are selected while higher priority data packets are not selected due to the quick loopback batch scheduling skipping over some network layers during the data packet batch selection process. Thus, where quick loopback batch scheduling is implemented, the hierarchical traffic manager 231 can be considered a scalable hierarchical traffic manager.

To correct this priority inversion or priority leak, the hierarchical traffic manager implements a form of low pass filter using a per priority first-in-first-out (FIFO) buffer 219, a straight priority arbiter 221, a mixed priority FIFO buffer 223 and a rate limiter 225. These components prevent low priority data packets from being forwarded at a higher rate than higher priority data packets when there is not sufficient bandwidth to forward all of the data packets at a desired rate.

The scalable hierarchical traffic manager 231 can be configured to have discrete components that implement the components or a set of execution units that execute the quick loopback batch scheduler 217 and the straight priority arbiter 221, the scalable hierarchical traffic manager can include the per priority FIFO buffer 219 and the mixed priority FIFO buffer 223 as internal storage components or they can be external storage structures.

The quick loopback batch scheduler 217 is configured to process the data packets to select one data packet at a time from set of candidate data packets to be forward. The quick loopback batch schedule 217 can apply priority rules for any subset of the network layers that are present in the network. The selected candidate data packet is placed in the per priority FIFO buffer 219 that is used to organize the currently selected data packet along with previously selected data packets. The per priority FIFO buffer 219 organizes the set of selected data packets that are scheduled to be forwarded primarily by priority and secondarily by order of arrival. That is order of arrival at the per priority FIFO buffer 219 can be utilized to prioritize among the set of data packets with the same priority.

The straight priority arbiter 221 is configured to select a data packet from the per priority FIFO buffer 219 that has a highest priority in the per priority FIFO. If more than one data packet in the per priority FIFO has the same priority in the highest available priority class, then a first arrival time for the highest priority class in the per priority FIFO buffer 219 can be utilized. In some embodiments, this selection of data packets by the straight priority arbiter 221 can be weighted such that each priority class has a defined throughput or minimum throughput to prevent starvation of particular priority classes.

The straight priority arbiter 221 then places the data packet selected from the per priority FIFO buffer 219 in a mixed-priority FIFO buffer to be forwarded toward a destination of the selected data packet.

The mixed priority FIFO buffer 223 is configured store the data packets placed in it, in a simple order of arrival at the buffer 223. The mixed priority FIFO buffer 223 is also configured to return a per priority flow control value to the per priority FIFO buffer 219 to limit low priority data packets being selected by the straight priority arbiter. The mixed priority FIFO buffer 223 is configured to forward data packets from a respective destination through a rate limiter 225. The per priority FIFO buffer is further configured to receive the per priority flow control value and to throttle low priority data packets to a lower bandwidth based on the per priority flow control value. The per priority flow control value is a threshold priority level, the straight priority arbiter is configured to limit packets forwarded to the mixed priority FIFO buffer that do not meet the threshold priority level. The per priority flow control value can be selected by the mixed priority FIFO by indicating a lowest priority in the mixed priority FIFO buffer or through a similar process. The straight priority arbiter 221 is further configured to fill the mixed priority FIFO buffer 223 with any available data packets from the per priority FIFO buffer 219 when the mixed priority FIFO buffer 223 is not full.

The rate limiter can be any type or form of rate limiter. The rate limiter can be programmed to limit the throughput of the hierarchical traffic manager generally, data packets from particular sources or having certain destinations or similar basis for differentiation. The rate limiter can operate in conjunction with other rate limiters within the linecard 203 or network element 201 to ensure proper flow of data packets through the network element 201 based on available resources in the network element 201.

Figure 3:
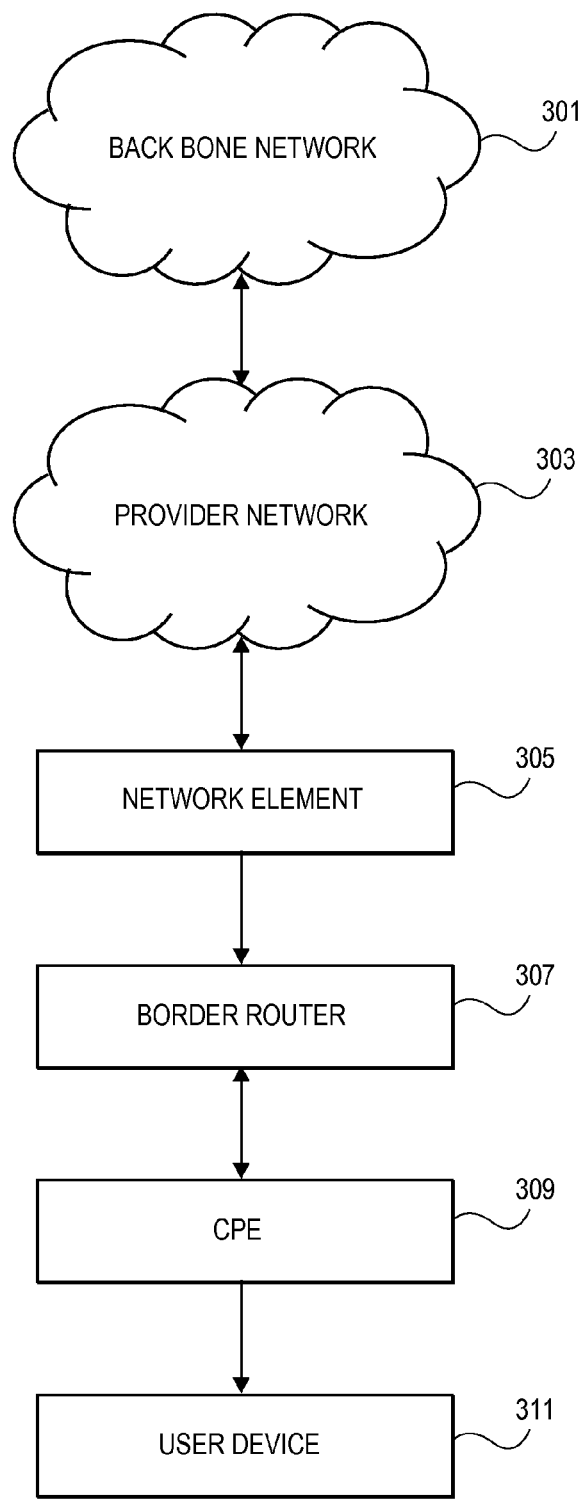
FIG. 3 is a diagram of one embodiment of a network including the network element.

FIG. 3 is a diagram of one embodiment of a network including the network element. The example network demonstrates a simplified context in which the network element 305 implementing the scalable hierarchical traffic manager. The network element can be any part of any type of network. In the example the network is a provider network 303 of an Internet Service Provider (ISP) or similar entity. The provider network 303 has a topology and may have several levels of network polices to implement. The network element 305 can communicate with source and destination devices through a backbone network 301 and border routers 307 through which the data packets traversing the network element reach their destination. These interfaces with other networks also opens up the possibility of additional network topology and layers that the network element may have to play a role in implementing.

The network element 305 can communicate with end user devices through the border router 307, which can lead to customer premise equipment such as a cable modem or residential gateway. The customer premise equipment (CPE) can then lead an end user device, which can also play a role in additional layers of network topology such as virtual private networks, secure communication channels and similar protocols that end user devices such as servers and personal computers may request that the network element 305 support in some capacity.

Figure 4:
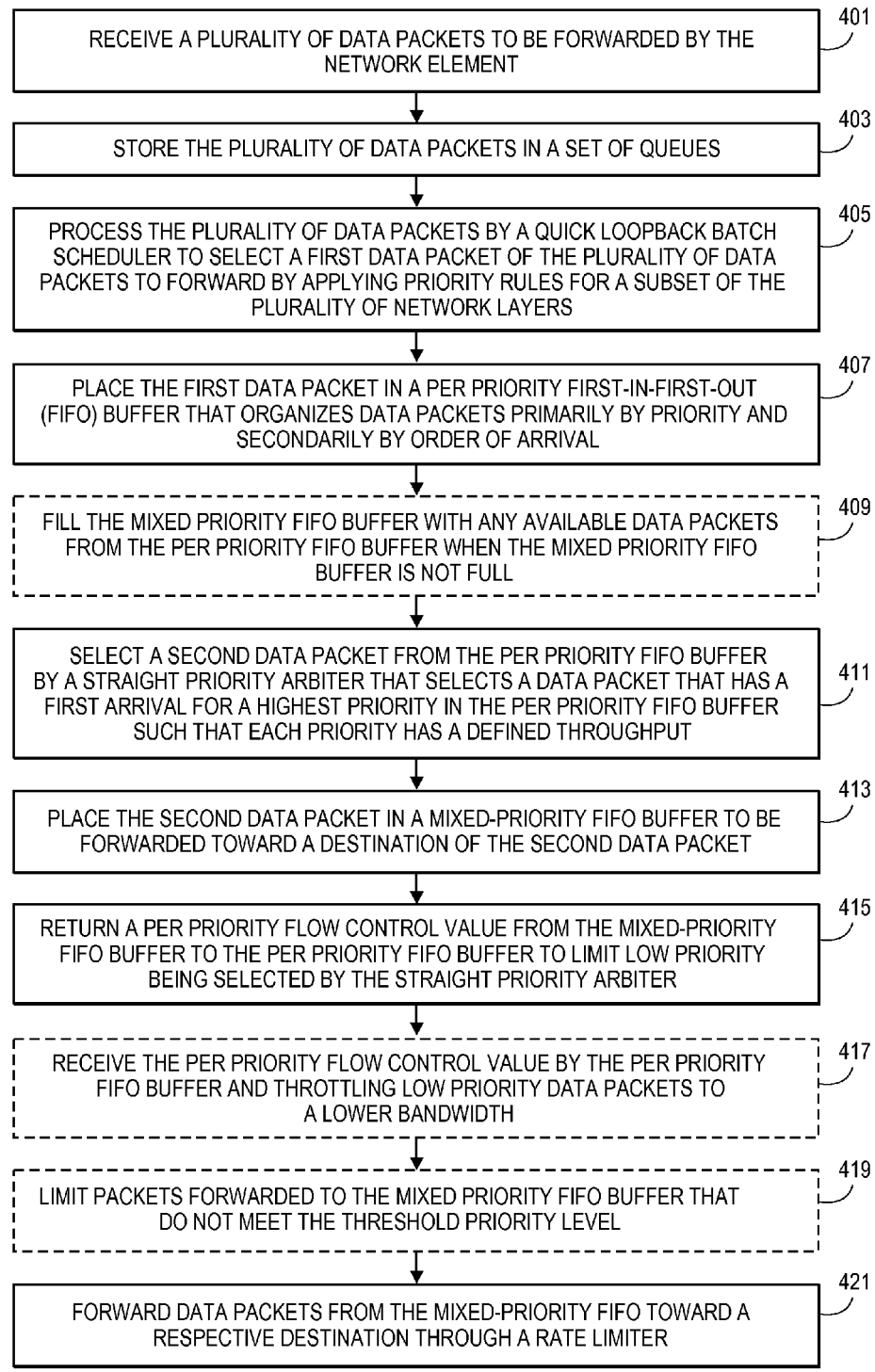
FIG. 4 is a flowchart of one embodiment of the operation of the low pass filter for the hierarchical traffic manager implementing quick loopback batch scheduling.

FIG. 4 is a flowchart of one embodiment of the operation of the low pass filter for the hierarchical traffic manager implementing quick loopback batch scheduling. The process executed by the scalable hierarchical traffic manager can be initiated in response to receiving a set of data packets to be forwarded by the network element (Block 401). This set of data packets is stored in a set of queue. These queues can be organized initially by priority, service type, source, destination or similar organization of the received data packets. These can be directly stored into the hierarchical traffic manager or initially stored is a separate set of queues that feed into the hierarchical traffic manager (Block 403).

As the set of data packets are provided to the hierarchical traffic processing the set of data packets are processed by the quick loopback batch scheduler to iteratively select a data packet from the set of candidate data packets to be forwarded. The quick loopback batch schedule functions by applying priority rules and similar criteria for a subset of the available network layers (Block 405). The selected data packet is placed in the per priority FIFO buffer that organizes data packets primarily by priority, type or classification and secondarily by order of arrival (Block 407). The per priority FIFO buffer can have any size or location and can roughly organize all data packets in the buffer by a priority classification groups that are ordered by their arrival order.

A data packet is then selected from the per priority FIFO buffer by a straight priority arbiterr that selects a data packet that has a first arrival time in a highest available priority group in the per priority FIFO buffer such that each priority group has a defined throughput that can be guaranteed at a minimum or involve a weighted distribution to ensure that higher priority groups are not starved (Block 411). In one embodiment, the straight priority arbiter is further configured to fill the mixed priority FIFO buffer with any available data packets from the per priority FIFO buffer when the mixed priority FIFO buffer is not full (Block 409).

The data packet selected by the arbiter is placed in a mixed-priority FIFO buffer to be forwarded toward a destination of the selected data packet (Block 413). The mixed priority FIFO buffer returns a per priority flow control value from the mixed-priority FIFO buffer to the per priority FIFO buffer to limit low priority data packets being selected by the straight priority arbiter (Block 415). The per priority flow control value can be utilized by the straight priority arbiter to determine whether lower priority data packets are to be limited or restricted from selection. The data packets are then forwarded from the mixed-priority FIFO toward a respective destination through a rate limiter (Block 417).

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the enhanced controller and switches may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element to provide scalable hierarchical traffic management (HTM) over a plurality of network layers for a network, the method including a set of steps comprising:
   receiving a plurality of data packets to be forwarded by the network element;
   storing the plurality of data packets in a set of queues;
   processing the plurality of data packets by a quick loopback batch scheduler to select a first data packet of the plurality of data packets to forward by applying priority rules for a subset of the plurality of network layers;
   placing the first data packet in a per priority first-in-first-out (FIFO) buffer that organizes data packets primarily by priority and secondarily by order of arrival;
   selecting a second data packet of the plurality of data packets from the per priority FIFO buffer by a straight priority arbiter that selects a data packet that has a first arrival for a highest priority in the per priority FIFO buffer such that each priority has a defined throughput;
   placing the second data packet in a mixed-priority FIFO buffer to be forwarded toward a destination of the second data packet;
   returning a per priority flow control value from the mixed-priority FIFO buffer to the per priority FIFO buffer to limit data packets having a low priority being selected by the straight priority arbiter; and
   forwarding data packets from the mixed-priority FIFO toward a respective destination through a rate limiter.

2. The method of claim 1, wherein the per priority FIFO buffer receives the per priority flow control value and throttles low priority data packets to a lower bandwidth.

3. The method of claim 1, wherein the second data packet selected from the per priority FIFO buffer is identical to the first data packet placed in the per priority FIFO buffer.

4. The method of claim 1, wherein forwarding data packets from the mixed-priority FIFO is by order of arrival.

5. The method of claim 1, further comprising the step of:
   filling the mixed priority FIFO buffer with any available data packets from the per priority FIFO buffer when the mixed priority FIFO buffer is not full.

6. The method of claim 1, wherein the per priority flow control value is a threshold priority level, the method comprising:
   limiting packets forwarded to the mixed priority FIFO buffer that do not meet the threshold priority level.

7. A network element implementing a scalable hierarchical traffic management (HTM) over a plurality of network layers for a network, the network element comprising:
   a set of ports to receive a plurality of data packets to be forwarded by the network element and to forward the plurality of data packets to a set of queues; and
   a network processor coupled to the set of ports, the network processor to execute the scalable HTM,
      the scalable HTM configured to execute a quick loopback batch scheduler and a straight priority arbiter, the scalable HTM including a per priority first-in-first-out buffer and a mixed priority buffer,
      the quick loopback batch scheduler configured to process the plurality of data packets to select a first data packet of the plurality of data packets to forward by applying priority rules for a subset of the plurality of network layers and to placing the first data packet in the per priority FIFO buffer that organizes data packets primarily by priority and secondarily by order of arrival,
      the straight priority arbiter to select a second data packet of the plurality of data packets from the per priority FIFO buffer that has a first arrival for a highest priority in the per priority FIFO buffer such that each priority has a defined throughput and to place the second data packet in a mixed-priority FIFO buffer to be forwarded toward a destination of the second data packet, and
      the mixed priority FIFO buffer to return a per priority flow control value from the mixed-priority FIFO buffer to the per priority FIFO buffer to limit data packets having a low priority being selected by the straight priority arbiter and to forward data packets from the mixed-priority FIFO toward a respective destination through a rate limiter.

8. The network element of claim 7, wherein the per priority FIFO buffer is further configured to receive the per priority flow control value and throttles low priority data packets to a lower bandwidth.

9. The network element of claim 7, wherein the second data packet selected from the per priority FIFO buffer is identical to the first data packet placed in the per priority FIFO buffer.

10. The network element of claim 7, wherein the mixed priority FIFO buffer is further configured to forward data packets by order of arrival.

11. The network element of claim 7, wherein the straight priority arbiter is further configured to fill the mixed priority FIFO buffer with any available data packets from the per priority FIFO buffer when the mixed priority FIFO buffer is not full.

12. The network element of claim 7, wherein the per priority flow control value is a threshold priority level, the straight priority arbiter is further configured to limit packets forwarded to the mixed priority FIFO buffer that do not meet the threshold priority level.

* * * * *

UNITED STATES PATENT AND TRADEMARK OFFICE
CERTIFICATE OF CORRECTION

PATENT NO. : 8,897,292 B2  Page 1 of 1
APPLICATION NO. : 13/731976
DATED : November 25, 2014
INVENTOR(S) : Yip et al.

It is certified that error appears in the above-identified patent and that said Letters Patent is hereby corrected as shown below:

Specification

In Column 1, Line 61, delete "MinLSlnterval" and insert -- MinLSInterval --, therefor.

In Column 1, Line 63, delete "(Rxmtlnterval)" and insert -- (RxmtInterval) --, therefor.

In Column 15, Lines 4-13, delete "Specifically, the.......LSR 140." and insert the same at Line 3, after "LSR 120" as a continuation paragraph.

Claims

In Column 18, Line 8, in Claim 1, delete "andresponsive" and insert -- and responsive --, therefor.

Signed and Sealed this
Twenty-seventh Day of October, 2015

Michelle K. Lee
*Director of the United States Patent and Trademark Office*